United States Patent [19]

Thelen et al.

[11] Patent Number: 5,297,473
[45] Date of Patent: Mar. 29, 1994

[54] PRESSURE COOKER

[75] Inventors: Arnold Thelen, Idar-Oberstein; Heinz P. Falkenstein, Rötsweiler-Nockenthal, both of Fed. Rep. of Germany

[73] Assignee: Fissler GmbH, Idar-Oberstein, Fed. Rep. of Germany

[21] Appl. No.: 959,602

[22] Filed: Oct. 13, 1992

[30] Foreign Application Priority Data

Oct. 10, 1991 [DE] Fed. Rep. of Germany ....... 4133524

[51] Int. Cl.$^5$ .............................................. A47J 27/08
[52] U.S. Cl. ........................................ 99/337; 99/403; 220/208; 220/298; 220/316
[58] Field of Search ................. 99/337, 338, 342, 403; 220/208, 298, 316, 321, 318, 323, 446; 126/369, 388, 389, 378, 373, 374

[56] References Cited

U.S. PATENT DOCUMENTS

| 2,395,602 | 2/1946 | Wittenberg | 220/298 |
|---|---|---|---|
| 2,462,287 | 2/1949 | Richeson et al. | 99/337 |
| 2,515,879 | 7/1950 | Korn | 99/337 |
| 3,667,649 | 6/1972 | Thillet . | |
| 4,024,982 | 5/1977 | Schultz | 220/316 |
| 4,162,741 | 7/1979 | Walker et al. | 220/208 |
| 4,313,371 | 2/1982 | Jackson et al. | 99/344 X |
| 4,627,417 | 12/1986 | von der Beck et al. | 126/369 |
| 4,711,366 | 12/1987 | Chen | 99/337 X |
| 4,733,795 | 3/1988 | Boehm | 220/316 |
| 4,932,550 | 6/1990 | Moucha | 99/403 X |
| 5,092,229 | 3/1992 | Chen | 99/337 |

FOREIGN PATENT DOCUMENTS

| 0108203 | 5/1984 | European Pat. Off. . | |
|---|---|---|---|
| 0112295 | 6/1984 | European Pat. Off. . | |
| 0139772 | 5/1985 | European Pat. Off. . | |
| 685690 | 11/1939 | Fed. Rep. of Germany . | |
| 3027064 | 2/1982 | Fed. Rep. of Germany | 126/389 |
| 2414318 | 8/1979 | France . | |
| 2531847 | 2/1984 | France . | |
| 6409983 | 3/1966 | Netherlands . | |
| 273354 | 5/1951 | Switzerland . | |
| 298094 | 7/1954 | Switzerland . | |
| 2120578 | 12/1983 | United Kingdom | 220/316 |

Primary Examiner—Timothy F. Simone
Attorney, Agent, or Firm—Wenderoth, Lind & Ponack

[57] ABSTRACT

A pressure cooker includes a container intended to hold cooking produce and which can be closed pressure tight with a cover that can be set on a rim of the container and locked thereto. The cover includes closing members movable between radially inward open positions, whereat the cover can be removed from the container, and radially outward locking positions, whereat the circumference of the cover is pressed against a region of the container rim with a circumferential sealing ring therebetween. The inside of the wall of the container in the region of the container rim includes a locking shoulder directed, for example, toward the container bottom, and a sealing shoulder directed, for example, toward the container opening. In the radially outward locking positions, the closing members are braced against the locking shoulder, thus pressing the sealing ring against the sealing shoulder.

20 Claims, 1 Drawing Sheet

PRESSURE COOKER

BACKGROUND OF THE INVENTION

The invention relates to a pressure cooker including a container which is intended to hold a cooking produce and which can be closed in a pressure tight manner by a cover that can be set on a rim of the container and locked therewith. The cover includes closing members that can be moved between open positions, in which the cover can be removed from the container, and locking positions, in which the circumference of the cover is pressed against a region of the container rim with a circumferential sealing ring therebetween.

Such a pressure cooker in known, for example from EP-A 0 108 203. In such known arrangement, the cover includes a centered hood and a frame. The frame sits by way of a sealing profile on a container rim that is bent down towards the outside. Locking members in radially inward locking positions thereof reach with an outer flange that is bent inwardly toward the bottom under the container rim. The cross section of the sealing profile is somewhat U-shaped and one sealing lip formed on a bottom end thereof rests against the container rim.

It is desired to impart to pressure cookers the least commercial appearance as possible despite expensive equipment thereof necessary to maintain safety requirements, to guarantee ease of handling when putting on, locking and unlocking the cover on the container, and to meet high safety requirements during use and handling of parts that are as simple as possible. The known pressure cooker cannot meet in a satisfactory manner these different requirements. In particular, a relatively complicated seal is necessary. Also, setting the cover on the container requires considerable dexterity, because, when viewed from the top, the outer diameter of the cover that is defined by the closing members does not correspond to the cover opening that is intended to accommodate the container rim. Further, the appearance of the cover is determined automatically by the closing members, because they have to envelope outwardly the hood, the frame and the container rim.

A pressure vessel for food to be used in a microwave oven is known from EP-A 0 112 295. The cover of such pressure vessel can be set pressure-tight on the container. In so doing, a cover body lies on an inner shoulder of a container wall. A gap between the outer circumference of the cover and the inner surface of the container wall is covered by a sealing ring that is arranged in an inner circumferential groove of the container wall at a distance above the inner shoulder that can be removed from such groove by means of a pull strap. To close the vessel the cover body is set on the inner shoulder of the container wall. Then the sealing ring, separated by hand, is inserted into the inner circumferential groove. While the vessel is being used for cooking, the entire inner pressure is absorbed by the sealing ring, whose clear inner diameter is somewhat less than the outer diameter of the cover body. Thus, necessary safety requirements cannot be met if operation is to be at higher pressure as in a pressure cooker, especially if additional measures to relieve the pressure are not taken, which, however, also can fail. When such known vessel is closed and opened, the cover body and the sealing member must be handled separately in an awkward manner.

A similar cooking vessel is known from CH-A-273 354. Here, too, in order to subsequently close the cover with respect to the container, a sealing ring, which is provided with a strap for removal, has to be inserted into a circumferential groove of the container rim that is accessible from the top.

A pressure cooker known from FR-A 2 531 847 has a cover equipped with a bracket that can be adjusted in axial distance from a cover body. In a locking position, outer ends of the bracket reach under two diametrically opposite catch hooks attached to the container rim. In the locking position the cover body itself rests with an O-ring, disposed in a circumferential groove, against an upper end of the container rim. The locking and opening of such a pressure cooker is relatively tedious, since the bracket must be adjusted with a spindle relative to the cover body. In addition, such a pressure cooker does not offer the requisite safety because the bracket is braced only at its two ends, and the catch hooks and/or the bracket can deform when subjected to considerable pressure. There is also the problem that the pressure prevailing in the vessel interior must be detected by the spindle.

SUMMARY OF THE INVENTION

The object of the invention is to provide a pressure cooker of the aforementioned type, but with which the drawbacks described above are avoided and in particular simple serviceability, use of simple parts, negligible commercial appearance and high safety all are possible.

This object is achieved, in a pressure cooker of the aforementioned type, in accordance with the invention in that the inside of the container wall in the region of the container rim includes a locking shoulder directed, for example, toward the container bottom and a sealing shoulder directed, for example, toward the container opening, and in that in radially outward locking positions locking members are braced against the locking shoulder and thus press a sealing ring against the sealing shoulder.

By such arrangement, the sealing ring can be designed as an O-ring over its entire cross section, or at least a significant portion of its cross section, and can be accommodated with a portion of its O-ring cross section in a circumferential groove of the cover that is open, e.g., in a radially outward direction. Such a sealing ring can be a readily available commercial part. However, it is also possible that the basic O-ring design of the sealing ring may include a sealing lip which is urged sealingly against the circumference of the inner surface of the container wall beneath the sealing ring by internal container pressure, thus further increasing the pressure tightness of the pressure cooker.

With a specific embodiment of the invention, the sealing shoulder is a container bottom side subregion of a holding groove which is open in the direction of the container opening and incorporated in the container wall. In this manner, deformability of the sealing shoulder is decreased. The same purpose is served by another embodiment of the invention according to which the locking shoulder is designed as a container opening side subregion of a working groove that is open in the direction of the axis of the container and incorporated in the container wall.

The setting of the cover on the container can be facilitated in that the container has a larger clear diameter in the region of the locking shoulder than in the region of the sealing shoulder. In this connection it is advantageous if the inner surface of the container wall extends continuously conically from radially outwardly to radially inwardly in the region of the working groove in the sealing shoulder, so that the cover is centered without any problems when it is set on the container. An especially simple manufacture of a pressure cooker according to the invention is guaranteed if the locking shoulder and/or the sealing shoulder, as well as preferably the working groove and/or the accommodating groove, are formed in the container wall with the wall thickness thereof remain substantially constant.

A uniform locking of the cover with respect to the container over the entire circumference can be guaranteed in that at least two closing members, distributed at equal angular intervals around the circumference of the cover and forming a substantial portion of the cover circumference, can be moved on a cover body by a common actuator, centered, e.g. on the cover body, between open positions and locking positions. A closing mechanism between the actuator and the closing members can include, for example, a connecting link guide which converts rotary motion of a cover knob mounted, e.g. on the cover body into a radial movement of the closing members. In this manner a simple and easy operation is guaranteed.

To provide the pressure cooker with an appearance that is as noncommercial as possible, the closing members, the closing mechanism and the actuator, except the cover knob, are covered by a cover hood. Since the closing members are moved radially outwardly only when in their locking positions, they remain virtually invisible to the user. If the pressure cooker is equipped with a safety and/or pressure relief valve in the cover, such valves also should be disposed under the cover hood so that they are invisible to the user. In such case, steam escaping from the interior of the pot through the valves can issue on the outer edge of the hood so as to be distributed over its circumference, whereby the risk of the user burning himself or herself is significantly reduced.

The function of the safety valve can be influenced up to final closure by means of the closing members since pressure is prevented from building up in the container as long as the closing members are in the position thereof. The closing members when in the locking position thereof can be prevented from opening by blocking the closing members by a pin of the safety valve. Preferably, no movement of the closing members in the opening direction thereof is possible until the pressure in the container interior has been totally released. Bursting pressure safety can be guaranteed by the O-ring issuing between the pot body and the closing members. Escaping team then can be drawn off at the top.

BRIEF DESCRIPTION OF THE DRAWING

Other objects, features, advantages and possible applications of the invention will be apparent from the following description with reference to the accompanying drawing. In so doing, all described and/or illustrated features by themselves or in any arbitrary logical combination form the subject matter of the present invention, independently of the claims.

DETAILED DESCRIPTION OF THE INVENTION

Figure 1:
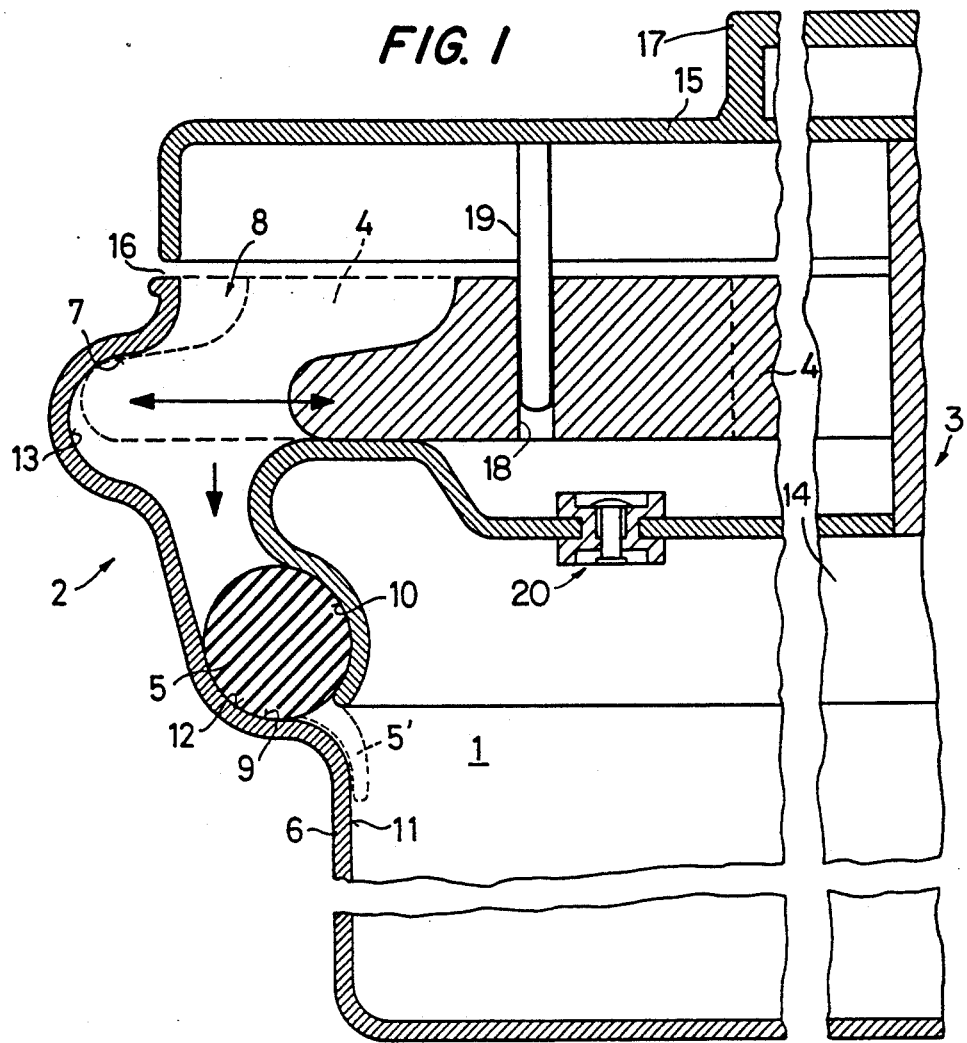
FIG. 1 is a sectional view of a pressure cooker including a specific embodiment of the invention in the region of a rim of a container and cover.

As shown in the drawings, a container 1 according to the invention has a substantially circular-cylindrical container wall 6 and a specifically shaped container rim 2 on which can be set a cover 3 to seal the container so as to be pressure tight. Cover 3 can be locked with the container rim in such sealed state. The cover 3 includes a body 14 and closing member 4 which, can be moved over body 14 by a closing mechanism (not illustrated) upon operation of an actuator (also not illustrated) between radially inward open positions (shown with solid lines) and radially outward locking positions (shown in dashed lines). In the open positions of the closing members 4 the cover 3 can be inserted from the top into an opening 8 of the container and removed therefrom. In the locking positions of the closing members 4, the circumference of the cover 3 is pressed downwardly toward a region of the container rim 2, with a peripheral sealing ring 5 therebetween.

As shown in FIG. 1, the container wall 6 has on its inside in the region of the container rim 2 a locking shoulder 7, directed in the direction of the container bottom (downwardly in FIG. 1), and a sealing shoulder 9, directed in the direction of an opening 8 of the container (upwardly in FIG. 1). It is important that the locking shoulder 7 and the sealing shoulder 9 face each other, so that the cover 3 can be braced on the container wall 6 by the radially outwardly moved closing members 4 while bracing the sealing ring 5 on the sealing shoulder 9. Thus, the closing members 4 are braced in their outer locking positions against the locking shoulder 7 while pressing the sealing ring 5 against the sealing shoulder 9. The distance between the locking shoulder 7 and the sealing shoulder 9 is dimensioned somewhat less than the dimension between the upper surface regions of the closing members 4 and the lower surface region of the sealing ring 5 that engage with the locking shoulder 7 and the sealing shoulder 9, respectively. During a locking operation, the sealing ring 5 is sufficiently compressed so that the container 1 is always reliably sealed by bracing the closing members 4 of the cover 3 against the peripheral locking shoulder 7 over the entire circumference of the container interior during cooking.

As is evident from the solid line illustration, the sealing ring 5 is designed as an O-ring over its entire cross section. A subregion or portion of the O-ring cross section of the sealing ring 5 is accommodated in a radially outwardly open circumferential groove 10 formed in the cover 3, e.g. in body 14. Due top the elasticity of its material and the resulting residual stress therein, the sealing ring 5 is retained in the groove 10 once fitted therein. The sealing ring 5 can be removed again with ease from the groove 10, for example, for cleaning or replacement purposes. The O-ring can be a commercially available part. As indicated with dashed lines, the sealing ring 5 can include a sealing lip 5' extending from its basic O-ring shape. Sealing lip 5' can be urged sealingly against an inner surface 11 of the container wall 6 beneath sealing shoulder 9 by the internal container pressure. On the one hand, this feature increases the desired tightness at raised internal container pressure, but on the other hand such arrangement necessitates that the sealing ring 5 have a specific cross sectional shape.

The sealing shoulder 9 is designed as a subregion or portion, located on the container bottom side relative to the locking shoulder 7 and that is concave corresponding to the surface shape of the sealing ring 5, of an accommodating groove 12 formed in container wall 6 to be open in the direction of the container opening 8. Since the accommodating or holding groove 12 is open in the direction of the container opening 8, the cover 3 with the sealing ring 5 can be inserted through the container opening 8 until the sealing ring 5 comes to rest on the sealing shoulder 9. Until then the closing members 4 are still positioned radially inwardly. When the closing members 4 subsequently are moved radially outwardly beyond the outer circumference of the sealing ring 5, the closing members 4 engage with the locking shoulder 7 which lies farther outwardly than the sealing shoulder 9. The locking shoulder 7 is designed as a container opening side portion or subregion, which is slightly concave in adaptation to the surface shape of the locking members 4, of a working groove 13 that is formed in wall 6 and that is open radially inwardly or in the direction of the container axis (thus to the right in FIG. 1). Thus, the container 1 has a larger clear diameter in the region of the locking shoulder 7 than in the region of the sealing shoulder 9, thereby guaranteeing a simple insertion of the cover 3 into the container opening 8. The goal of centering the cover 3 when it is inserted into the container opening 8 is achieved in that the inner surface 11 of the container wall 6 from the region of the working groove 13 to the sealing shoulder 9 (thus from top to bottom in FIG. 1) always extends conically from radially outwardly to radially inwardly.

The working groove 13 and the accommodating groove 12 and thus also the locking shoulder 7 and the sealing shoulder 9 are formed into the container wall 6 at substantially constant wall thickness. In this manner the container rim 2, which is reinforced by formation of the grooves, can also withstand raised internal container pressure and, therefore, guarantee maximum safety.

Figure 2:
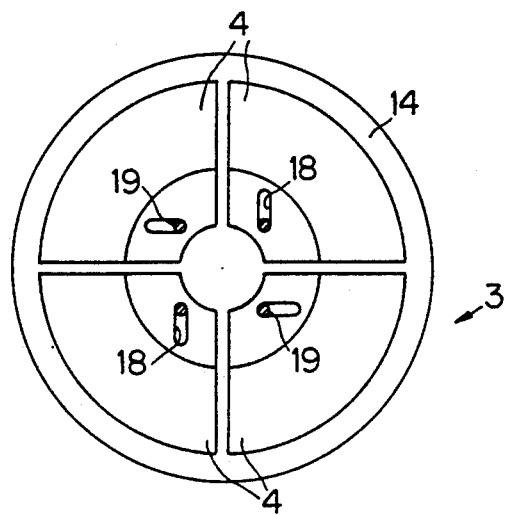
FIG. 2 is a plan view, with a hood not shown, of the cover of FIG. 1.

Only one closing member 4 can be seen in FIG. 1. In practice, at least two, preferably for example three or four such closing members 4 are movably mounted on the cover body 14 at equal angular distances from each other (as shown in FIG. 2) for movement between the open positions and locking positions thereof, e.g., by a common actuator, centered, e.g., on the cover body 14. In such arrangement, the outer contour of the closing members 4 is shaped in such a manner that members 4 envelop virtually the entire outer circumference of the cover 3, except for small intermediate spaces between adjacent members. Thus, the cover 3 can be locked with respect to the container 1 over the entire circumference thereof.

The actuator may be, e.g. a cover knob 17. A closing mechanism between the actuator 17 and the closing members 4 can include a connecting link guide, i.e. slots 18 and pins 19, that converts rotary motion of a cover knob mounted, e.g., on the cover body 14 into a radial motion of the closing members 4. Such closing mechanism can be analogous to that known from EP-A-0 108 203, with the only difference being that the locking positions of the closing members 4 are radially outwardly and the open positions of the closing members 4 are radially inwardly.

The closing members 4, the closing mechanism and the actuator except for the cover knob 17 can be covered by a cover hood 15, so that the entire locking mechanism of the cover remains invisible to the user, since it is housed between cover body 14 and hood 15. Even the outer ends of the closing members 4 are invisible to the user since they are positioned radially outwardly only when the cover 3 is set on the container 1, i.e. when members 4 fit within the working groove 13. When the cover 3 is to be equipped with a safety valve and/or pressure relief valve 20, for which known constructions can be used, it is also advantageous to arrange such valves in the cover body 14 below the cover hood 15. This also has the advantage that the technical or mechanical element remain invisible to the user, and serve the purpose that jets of steam issuing from such valves is deflected to issue only from a circumferential gap 16 between the upper edge of the container rim 2 and the bottom edge of the rim of the cover hood 15.

In accordance with the invention, readily deformable bayonet segments that make it difficult to put the cover on the container are not necessary for the cover locking mechanism. Also, unnecessary are an outwardly bent circumferential edge of the container which interacts with inwardly bent flanged segments of the closing elements that can also be easily deformed. Furthermore, a commercially available O-ring can be used as the sealing ring 5 in the standard design of the invention. The mounting, locking, unlocking and removal of the cover easily is possible without any great amount of strength or effort required by the user.

In addition, with the pressure cooker of the invention, can be taken that the closing members 4 can be moved into their open positions only if a raised pressure no longer prevails in the container interior, thus meeting safety requirements for such pressure cookers. This can be achieved, for example, by blocking the closing members 4 in the locking positions thereof by means of a valve pin of a safety valve.

We claim:

1. A pressure cooker comprising:
    a container having a wall forming a container bottom and an upper rim defining a container opening, said rim including an inner annular locking shoulder directed toward said container bottom and an inner annular sealing shoulder directed toward said container opening;
    a cover to be mounted on said rim in a pressure tight manner, said cover including a cover body having a circumferential sealing ring and plural closing members; and
    said closing members being mounted on said cover body for movement relative thereto between an open position, wherein said cover selectively is insertable into and removable from said container opening, and a locking position, whereat said closing members are braced against said locking shoulder and thereby press said sealing ring into pressure tight contact with said sealing shoulder.

2. A pressure cooker as claimed in claim 1, wherein said sealing ring comprises an O-ring.

3. A pressure cooker as claimed in claim 2, wherein said O-ring fits in an outwardly facing circumferential groove formed in said cover body.

4. A pressure cooker as claimed in claim 2, wherein said O-ring has a round cross section.

5. A pressure cooker as claimed in claim 2, wherein said sealing ring further includes an annular sealing lip depending from said O-ring and sealingly pressed by internal container pressure against an inner surface of said container wall at a position beneath said sealing shoulder.

6. A pressure cooker as claimed in claim 1, wherein said sealing shoulder is formed by a region of an annular holding groove formed in an inner surface of said container wall to be open toward said container opening.

7. A pressure cooker as claimed in claim 6, wherein said locking shoulder is formed by a region of an annular working groove formed in said container wall and open radially inwardly.

8. A pressure cooker as claimed in claim 7, wherein said inner surface of said container wall extends continuously conically from radially outwardly adjacent said working groove to radially inwardly at said sealing shoulder.

9. A pressure cooker as claimed in claim 7, wherein said container wall has a substantially constant thickness from said working groove to said holding groove.

10. A pressure cooker as claimed in claim 1, wherein said locking shoulder is formed by a region of an annular working groove formed in said container wall and open radially inwardly.

11. A pressure cooker as claimed in claim 1, wherein said container wall has a substantially constant thickness from said locking shoulder to said sealing shoulder.

12. A pressure cooker as claimed in claim 1, wherein said container has a larger inner diameter in the region of said locking shoulder than that in the region of said sealing shoulder.

13. A pressure cooker as claimed in claim 1, wherein said sealing shoulder is positioned closer to said container bottom than is said locking shoulder.

14. A pressure cooker as claimed in claim 1, wherein said closing members are movable radially outwardly relative to said cover body from said open position to said locking position.

15. A pressure cooker as claimed in claim 14, wherein said closing members are spaced equi-angularly of said cover body about a center thereof.

16. A pressure cooker as claimed in claim 15, further comprising an actuator mounted on said cover body for rotation, and a link guide mechanism operable upon rotation of said actuator to move said closing members radially relative to said cover body.

17. A pressure cooker as claimed in claim 16, wherein said actuator comprises a cover knob.

18. A pressure cooker as claimed in claim 17, further comprising a cover hood mounted to said cover body and covering said closing members and said link guide mechanism.

19. A pressure cooker as claimed in claim 18, wherein said cover knob is mounted on said cover hood.

20. A pressure cooker as claimed in claim 18, further comprising a safety/pressure relief valve mounted on said cover and covered by said cover hood.

* * * * *